United States Patent
Iqbal et al.

(10) Patent No.: US 10,523,552 B2
(45) Date of Patent: *Dec. 31, 2019

(54) APPLICATION-AWARE EQUAL COST MULTIPATH DISCOVERY MECHANISM

(71) Applicant: Cisco Technology, Inc., San Jose, CA (US)

(72) Inventors: Faisal Iqbal, Ottawa (CA); Sagar Soni, Ottawa (CA); Nagendra Kumar Nainar, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,734

(22) Filed: Oct. 10, 2018

(65) Prior Publication Data

US 2019/0081882 A1    Mar. 14, 2019

Related U.S. Application Data

(63) Continuation of application No. 15/468,890, filed on Mar. 24, 2017, now Pat. No. 10,158,556.

(51) Int. Cl.
*H04L 12/751* (2013.01)
*H04L 12/803* (2013.01)
*H04L 12/723* (2013.01)
*H04L 12/725* (2013.01)

(52) U.S. Cl.
CPC ............ *H04L 45/02* (2013.01); *H04L 45/306* (2013.01); *H04L 45/50* (2013.01); *H04L 47/125* (2013.01)

(58) Field of Classification Search
CPC ........ H04L 45/02; H04L 45/50; H04L 47/125
See application file for complete search history.

(56) References Cited

U.S. PATENT DOCUMENTS

| 8,374,164 | B2 | 2/2013 | Nadeau et al. | |
|---|---|---|---|---|
| 9,923,798 | B1 * | 3/2018 | Bahadur | ................. H04L 45/00 |
| 2011/0317696 | A1 | 12/2011 | Aldrin et al. | |
| 2012/0163180 | A1 * | 6/2012 | Goel | ....................... H04L 45/30 |
| | | | | 370/238 |
| 2014/0198634 | A1 | 7/2014 | Aldrin et al. | |
| 2014/0280950 | A1 * | 9/2014 | Bhanujan | ............ H04L 67/1002 |
| | | | | 709/226 |

(Continued)

OTHER PUBLICATIONS

Kompella, K., "Detecting Multi-Protocol Label Switched (MPLS) Data Plane Failures," Network Working Group, RFC 4379, Feb. 2006, 50 pages; https://tools.ietf.org/pdf/rfc4379.pdf.

*Primary Examiner* — Afshawn M Towfighi

(57) ABSTRACT

One embodiment is a method including creating at an ingress node of a communications network a request message identifying a hashing parameter for a network application, and including range of values for the identified hashing parameter to enable load balancing for packets associated with the network application; forwarding the created request message to a node associated with a next hop along a first path through the network between the ingress node and an egress node; and receiving a response message from the node associated with the next hop, wherein the response message includes load balancing information for the node associated with the next hop corresponding to the range of values for the identified hashing parameter.

20 Claims, 21 Drawing Sheets

(56) References Cited

U.S. PATENT DOCUMENTS

| | | |
|---|---|---|
| 2015/0029872 A1 | 1/2015 | Pignataro et al. |
| 2015/0030026 A1 | 1/2015 | Kumar et al. |
| 2015/0109907 A1* | 4/2015 | Akiya .................. H04L 47/125 370/229 |
| 2015/0138947 A1 | 5/2015 | Nainar et al. |
| 2016/0142278 A1 | 5/2016 | Pignataro et al. |
| 2018/0278510 A1 | 9/2018 | Iqbal et al. |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
```
54 — | AS TYPE | LENGTH |
50(1) — APPLICATION SPECIFIC MAPPING SUB-TLV
60 — OPTIONAL MULTIPATH TLV (NEXT TO SUB-TLV WITH H FLAG SET)

50(N) — APPLICATION SPECIFIC MAPPING SUB-TLV

FIG. 3A

56 — | AS SUB-TLV TYPE | LENGTH |
58 — | SUB-TLV ADDRESS FAMILY | RESERVED | FLAGS | — 52

SUB TLV INFORMATION

FIG. 3B

| MULTIPATH TYPE | DEPTH LIMIT | MULTIPATH LENGTH |

(MULTIPATH INFORMATION)

FIG. 3C

| ECHO REPLY FROM R2 | |
|---|---|
| SRC=R2, DST=R1 | |
| ECHO REPLY | |
| DOWNSTREAM MAPPING (R6.1) | DOWNSTREAM MAPPING (R6.2) |
| BASE=FFFF:127.0.0.1 | 1,0,0,0,1,0,0,0 | BASE=FFFF:127.0.0.1 | 0,0,0,1,0,0,0,1 |
| APP SPEC MAPPING TLV (R4) | APP SPEC MAPPING TLV (R5) |
| SRC=R1, DST=R6 | SRC=R1, DST=R6 |
| FLOW LABEL: 1000000 | FLOW LABEL: 1000000 |
| BASE=49152 | 0,0,1,0,0,0,1,0 | BASE=49152 | 0,0,0,1,0,0,0,1 |

- PATH 1: SRC IP: R1, DST IP: R6, FLOW LABEL: 100002, NH:R2
- PATH 2: SRC IP: R1, DST IP: R6, FLOW LABEL: 100003, NH:R2
- PATH 3: SRC IP: R1, DST IP: R6, FLOW LABEL: 100001, NH:R2
- PATH 4: SRC IP: R1, DST IP: R6, FLOW LABEL: 100000, NH:R3

APPLICATION-AWARE EQUAL COST MULTIPATH DISCOVERY MECHANISM

CROSS REFERENCE TO RELATED APPLICATION

This application is a continuation of U.S. application Ser. No. 15/468,890, filed Mar. 24, 2017, the entirety of which is incorporated herein by reference.

TECHNICAL FIELD

This disclosure relates in general to the field of communications networks and, more particularly, to an application-aware Equal Cost Multipath ("ECMP") discovery mechanism using templatized application immutable protocol fields in such communications networks.

BACKGROUND

Equal Cost Multipath ("ECMP") is widely used in modern networks to load balance network traffic across various paths to a destination. Network devices use packet parameters such as IP addresses and port numbers, for example, to load balance traffic across available equal cost paths. A network application, such as Bidirectional Forwarding Detection ("BFD") or Multiprotocol Label Switching ("MPLS") Delay Measurement may require knowledge of ECMP in the network to provide full coverage for the network. In the case of BFD, lack of this coverage translates to only a subset of paths being monitored for faults while customer traffic may be going over any combination of ECMP from ingress to egress. However, adding ECMP path discovery capability is often either impractical due to existing specifications or expensive and redundant from an application engineering point of view. Instead of each application discovering its own ECMP, this work can be offloaded to another tool designed specifically for the purpose of discovering networks paths based on load balancing criteria provided for the application.

An MPLS Label Switched Path ("LSP") Tree Trace feature provides the ability to deterministically discover all possible ECMP of an LSP by altering the destination address, while maintaining other flow parameters constant. Subsequently, an MPLS echo request packet that uses the discovered destination address will load-balance over the same ECMP identified by Tree Trace; however, the paths discovered in this manner are valid only for MPLS echo request flows, using the same source and destination IP addresses and port numbers used for discovery. If an application such as Multi-Hop BFD, using a different source port or destination port, attempts to directly use the discovered destination address of a particular path, hardware may load balance the flow into a diverging path.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A illustrates a format of a Application Specific Mapping ("ASM") Type-Length-Value element ("TLV") for use in implementing an application-aware ECMP discovery mechanism in accordance with embodiments described herein;

FIG. 3B illustrates a format of an ASM sub-TLV of the ASM TLV of FIG. 3A for use in implementing an application-aware ECMP discovery mechanism in accordance with embodiments described herein;

FIG. 3C illustrates a format of a Multipath sub-TLV of the ASM TLV of FIG. 3A for use in implementing an application-aware ECMP discovery mechanism in accordance with embodiments described herein;

DETAILED DESCRIPTION OF EXAMPLE EMBODIMENTS

Overview

One embodiment is a method including creating at an ingress node of a communications network a request message including an Application Specific Mapping ("ASM") TLV identifying a hashing parameter for a network application, wherein the ASM TLV includes range of values for the identified hashing parameter to enable load balancing for packets associated with the network application; forwarding the created request message to a node associated with a next hop along a first path through the network between the ingress node and an egress node; and receiving a response message from the node associated with the next hop, wherein the response message includes load balancing information for the node associated with the next hop corresponding to the range of values for the identified hashing parameter.

Example Embodiments

Figure 1:
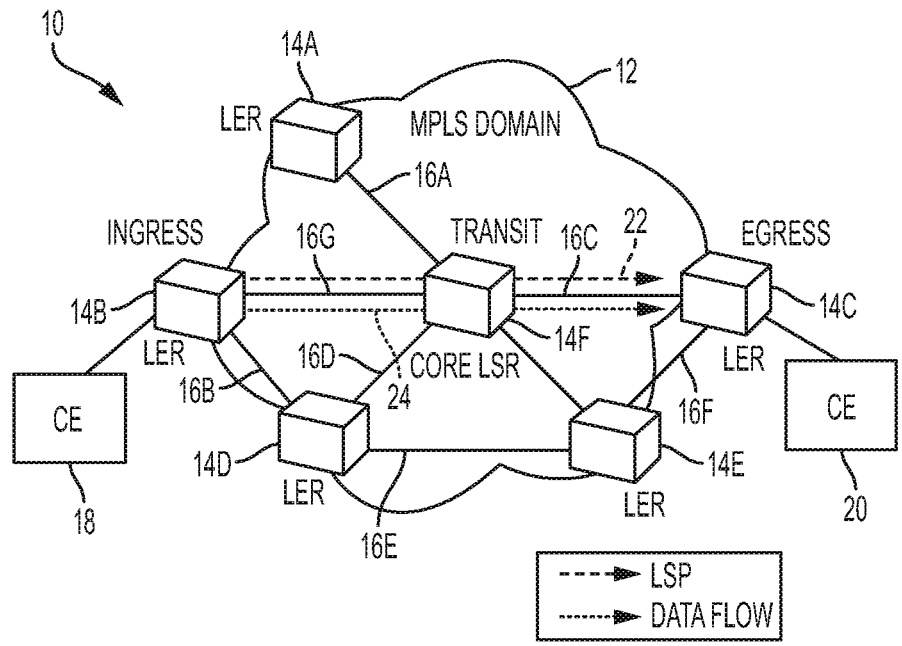
FIG. 1 illustrates a simplified block diagram of a telecommunications network comprising an MPLS domain for implementing an application-aware ECMP discovery mechanism in accordance with embodiments described herein.

Referring to FIG. 1, illustrated therein is a simplified block diagram of a telecommunications network 10 comprising an MPLS domain 12 for implementing an application-aware ECMP discovery mechanism in accordance with embodiments described herein. As shown in FIG. 1, MPLS domain 12 includes a plurality of routers 14A-14F interconnected by links 16A-16G for carrying data between customer networks represented by Customer Edge ("CE") nodes 18, 20. In an MPLS domain, such as MPLS domain 12, data is directed from one network node to another based on short MPLS labels (as opposed to long network addresses), thereby avoiding complex routing table lookups. The MPLS labels identify virtual links, or paths, between nodes rather than endpoints. MPLS can encapsulate packets of a variety of network protocols and supports a range of access technologies. MPLS operates by adding to packets an MPLS header containing one or more labels, referred to as a "label stack."

MPLS-labeled packets are switched after a label lookup (as opposed to an address lookup). An MPLS router that performs routing based on label lookup is referred to as a Label Switch Router ("LSR") or transit router. LSRs are located in the middle of an MPLS network and are responsible for switching the labels used to route packets. Referring to FIG. 1, router 14F is a transit router or LSR. When an LSR receives a packet, it uses the label in the packet header as an index to determine the next hop on the label-switched path ("LSP") and a corresponding label for the packet from a lookup table. The old label is removed from the header and replaced with the label from the lookup table before the packet is routed forward.

A Label Edge Router ("LER") is a router that operates on the edge of an MPLS network and functions as the entry/exit point of the network. Referring again to FIG. 1, routers 14A-14D are LERs. LERs push an MPLS label onto an incoming packet and pop an MPLS label off of an outgoing packet. Alternatively, penultimate hop popping may be performed, in which case the LSR directly connected to the LER pops the MPLS label off the packet. As an ingress LER for an IP packet, the LER uses routing information to determine appropriate MPLS labels to be affixed to the packet, labels the packet, and then forwards the labeled packet into the MPLS domain. Similarly, as an egress LER for a packet, the LER strips (or "pops") the MPLS label off of the packet and forwards the resulting IP packet using normal IP forwarding rules. Referring to FIG. 1, router 14B is an ingress LER, while router 14C is an egress router.

In the context of an MPLS-based Virtual Private Network ("VPN"), an LER that functions as an ingress and/or egress router to the VPN may be referred to as a Provider Edge ("PE") router. Devices that function only as transit routers in the VPN are referred to simply as Provider ("P") routers. Labels are distributed between LERs and LSRs using Label Distribution Protocol ("LDP"). LSRs in an MPLS network regularly exchange label and reachability information with each other using standardized procedures in order to build a complete picture of the network that may be used to forward packets. Label Switched Paths ("LSPs") are established by a network operator for a variety of purposes, such as to create network-based IP virtual private networks or to route traffic along specified paths through the network.

When an unlabeled packet enters the MPLS domain (e.g., from CE node 18), the ingress LER first determines Forwarding Equivalence Class ("FEC") for the packet and adds the MPLS label stack to the packet. The packet is then passed on to the next hop router of the tunnel. When a labeled packet is received by an MPLS router, the topmost label is examined. Based on the contents of the label a "swap," "push" ("impose"), or "pop" ("dispose") operation is performed on the packet's label stack. Routers may include lookup tables that dictate which kind of operation to do based on the topmost label of the stack to facilitate packet processing. In a swap operation, the label is replaced with a new label and the packet is forwarded along the path associated with the new label. In a push operation, a new label is pushed onto the top of the stack. In a pop operation, the label is removed from the packet, which may expose a label below. This process may be referred to as "decapsulation". If the popped label was the last label on the stack, the packet exits the MPLS tunnel. During these operations, the contents of the packet below the MPLS Label stack are not examined. Indeed, transit routers typically need only to examine the topmost label on the stack. The forwarding of the packet is done based on the contents of the labels, which allows "protocol-independent packet forwarding" that does not need to look at a protocol-dependent routing table and avoids the expensive IP longest prefix match at each hop.

A label switched path ("LSP"), or MPLS tunnel, is a path through an MPLS network established by a signaling protocol (e.g., LDP, RSVP-TE, BGP, CR-LDP, etc.). In FIG. 1, an LSP is designated by reference numeral 22. The path is established based on criteria in the FEC. The LSP begins at an LER, which determines which label to push to a packet, based on the corresponding FEC. The LER then forwards the packet to the next router along the LSP, which swaps the packets outer label for another label and forwards it to the next router. The last router in the path removes the label from the packet and forwards the packet based on the header of its next layer (e.g., to CE node 20). As previously noted, the router that first pushes an MPLS header to a packet is referred to as the ingress router. The last router in the LSP (which typically pops the label from the packet), is referred to as the egress router. Intermediate routers, which only need to swap labels, are referred to as transit routers or LSRs.

Figure 2:
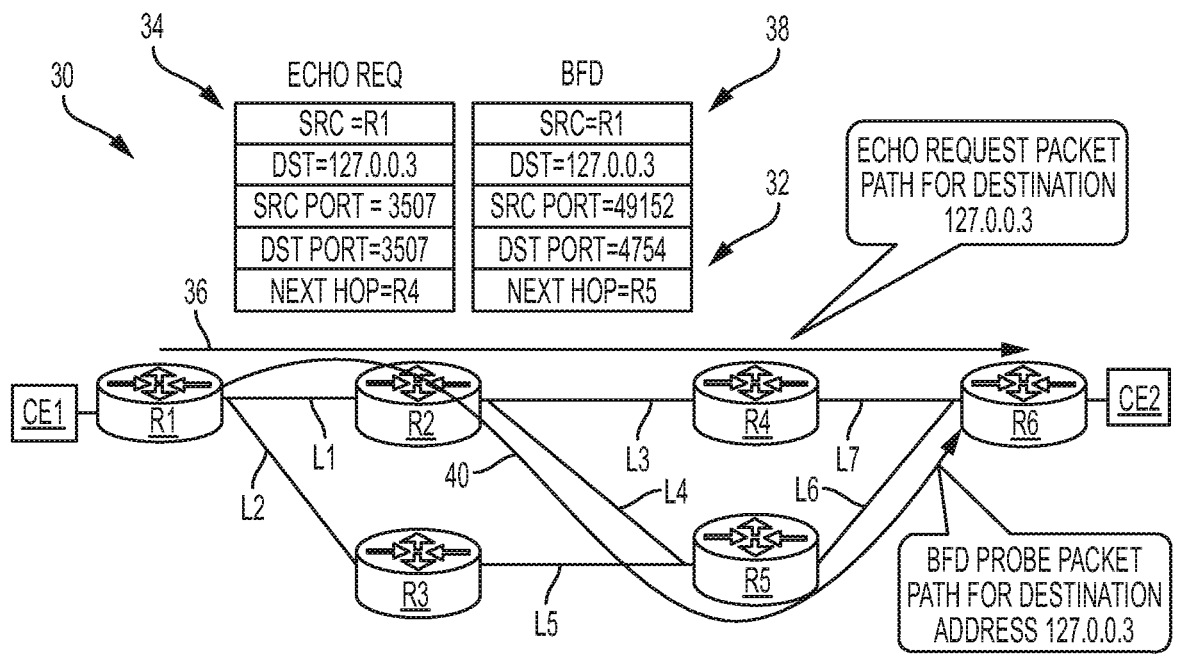
FIG. 2 illustrates a simplified block diagram of another telecommunications network comprising an MPLS domain for implementing an application-aware ECMP discovery mechanism in accordance with embodiments described herein.

FIG. 2 illustrates a simplified block diagram of a telecommunications network 30 comprising an MPLS domain 32 for implementing an application-aware ECMP discovery mechanism in accordance with embodiments described herein. As shown in FIG. 2, the MPLS domain 32 interconnects customer equipment CE1 with customer equipment CE2 and includes a plurality nodes, or routers, R1-R6 interconnected by links L1-L7.

An MPLS echo request packet 34 received at router R2 against source address of R1 and destination address 127.0.0.3 is load balanced toward next hop router R4 along a path 36. If BFD tries to utilize this information to setup a BFD session and monitor the discovered path, it will use the same source and destination IP address tuple (R1, 127.0.0.3). However, BFD probe packets, represented in FIG. 2 by a BFD packet 38, use different port numbers than the MPLS echo request packet 34. As a result, the hardware may load-balance the BFD probe toward router R5, along a path 40, instead of router R4, resulting in a situation in which multiple BFD sessions are monitoring the same paths while a subset of paths (e.g., links L3 and L7, in the example illustrated in FIG. 2) remains unmonitored, leading to undetected faults.

In accordance with features of embodiments described herein, an extension is proposed to MPLS Tree Trace functionality to enable discovery of available ECMPs in a network for an external application. The application provides input parameters and a variable field that the MPLS Tree Trace tool uses to discover the network paths. The external application may be any application that tunes its flow parameters to load balance the traffic across ECMP.

In accordance with certain embodiments described herein, an application-aware ECMP discovery mechanism includes an additional TLV (referred to herein as "Application Specific Mapping ('ASM') TLV") in MPLS Tree Trace echo requests. The ASM TLV contains hashing parameters used by the application. One parameter in the ASM TLV may be selected as entropy on which to load balance. The application can provide a range of values for the selected parameter to enable load-balancing. The range of values may be specified in an optional Multipath sub-TLV, the format of which is similar to 127/8 destination address encoding used in MPLS Tree Trace for discovery. As will be described in greater detail below, upon receipt of the request, a request responder queries hardware for load balancing of the Operations Administration Maintenance ("OAM") echo request as well as application packets. Results are encoded back in the echo reply using the Multipath sub-TLV. Upon completion of discovery, the application is notified of all ECMP in the network along with variable parameter values that will result in the use of a specific path.

In particular, the ASM TLV, which enables the application to identify a parameter for load-balancing, is a TLV defined to allow discovery of paths by using application specified header (Source IP/Destination IP) range, Transport (Source Port/Destination Port), Entropy Label range, Incoming Label, or any other hash parameter with respect to which the application would like to discover a path. FIG. 3A illustrates the format of an ASM TLV in accordance with embodiments described herein.

An ASM TLV can have multiple ASM sub-TLVs, represented in FIG. 3A by a ASM sub-TLVs 50(1) and 50(N), the format of which is illustrated in FIG. 3B, but the first bit in a FLAGS field (designated the H flag) 52 (FIG. 3B) should be set on only one of the sub-TLVs. An ASM TLV should be defined such that combining all of the sub-TLVs thereof gives a valid input parameter for hashing logic.

Table 1 below indicates the types of TLVs that may be defined in an AS Type field 54 of the ASM TLV (FIG. 3A) and an AS sub-TLV Type field 56 of the ASM sub-TLV (FIG. 3B) and the valid multipath type associated with each type.

TABLE 1

| Type | Valid Multipath Type |
|---|---|
| Source Address | IP Address (2), IP address range (4) or Bit masked IP address set |
| Destination Address | IP Address (2), IP address range (4) or Bit masked IP address set |
| Source Port | Bit Masked Port set (newly defined in this document) |
| Dest port | Bit Masked Port set (9) |
| Label | Bit Masked Label set (9) |

An Address Family field 58 of the ASM sub-TLV (FIG. 3B) indicates the type of address and must be set to one of the assigned values in an IANA Address Family Numbers registry wherever applicable based on TLV type. As previously noted, the FLAGS field 52 of the ASM sub-TLV (FIG. 3B) is an eight-bit field, the first bit of which is designated an H flag. If the H flag of a sub-TLV is set (and the remaining bits are zero), the ASM TLV must include a Multipath sub-TLV 60 (FIG. 4A) after the sub-TLV. The format of the Multipath sub-TLV is illustrated in FIG. 3C. The fields of the Multipath sub-TLV are the same as those defined in the aforementioned IETF RFC 4379.

IETF RFC 4379 defines MPLS Ping and Traceroute tools and extends their application for path discovery. Among the available hashing parameters of source and destination IP address and ports, the port numbers are fixed (port 3503) while the source IP address also has to be a routable IP address of the source node. Discovery is performed using the destination IP address, which can be any valid IP address in IPv4 range 127.0.0.0/8. MPLS Tree Trace modifies the destination IP address, while keeping the remaining hashing parameters (source IP address and source/destination ports) fixed to discover available entropies in the network.

While the availability of 127/8 range for path discovery works for MPLS Tree Trace, another protocol or application that wishes to discover equal cost paths may or may not use this range and may instead rely on a different source/destination IP range, UDP/TCP source/destination port range, or MPLS Label range. Even if an application is able to use 127/8 range, it may use a different source or destination port number than the one used by MPLS Tree Trace. As a result, the hardware may load balance the packets of the application differently than the MPLS echo request packets, in which case any load balancing information obtained using MPLS Tree Trace will be invalid. In embodiments described herein, the mechanism for discovering multiple paths using MPLS Tree Trace is enhanced to discover multiple paths for other applications by allowing such applications to provide one of ECMP parameter base value (IP addresses, TCP/UDP ports or MPLS Label) and its range, in addition to other fixed parameters specific to the application. Embodiments described herein include mechanisms for mapping between MPLS Tree Trace and another ECMP parameter specified by a different application/protocol; the only assumption is that range specified for ECMP parameter is same in length as the range used by MPLS Tree Trace.

Figure 4A:
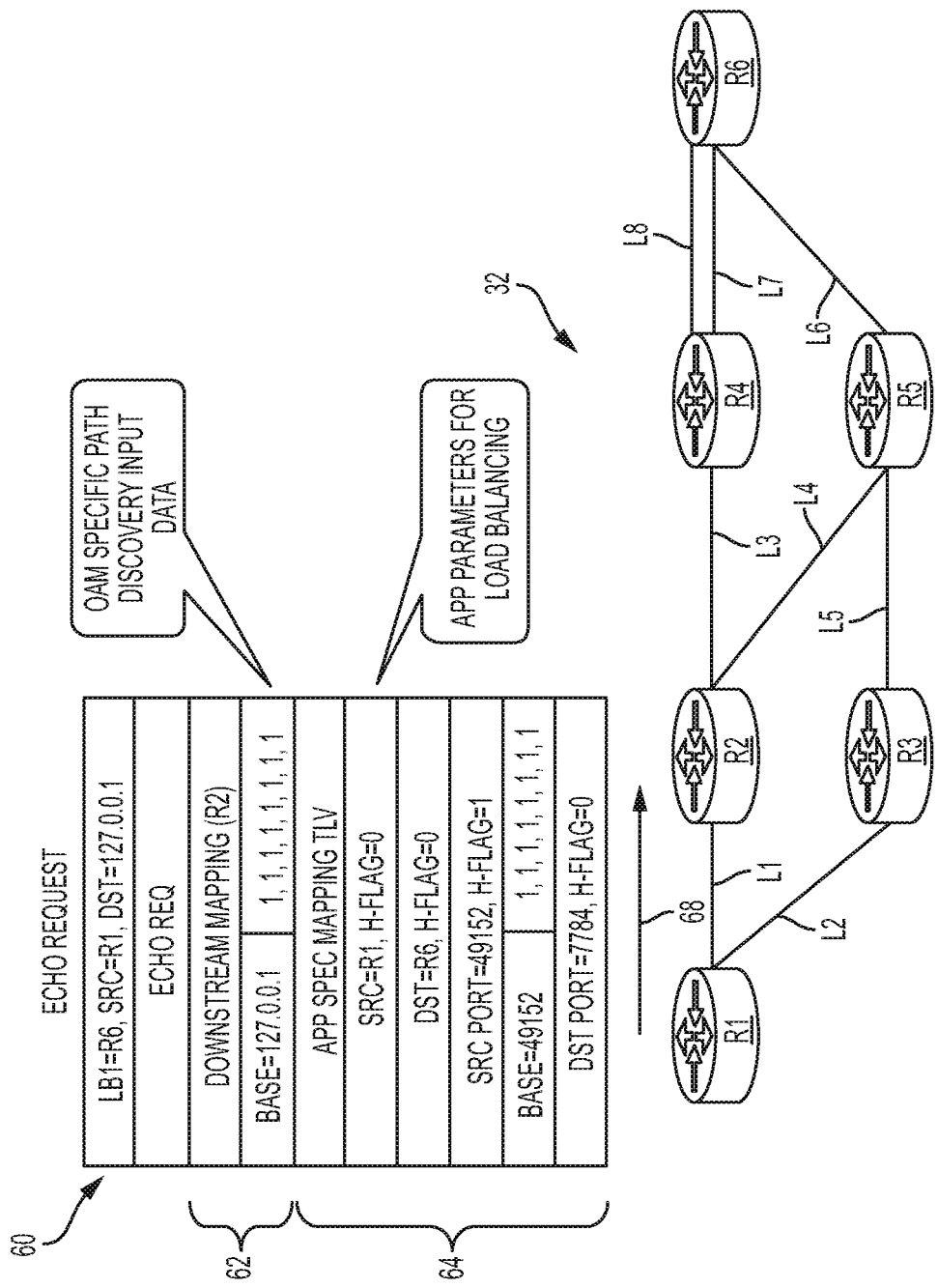
FIGS. 4A-4E illustrate simplified block diagrams of yet another telecommunications network comprising an MPLS domain for implementing an application-aware ECMP discovery mechanism in accordance with embodiments described herein in which load balancing is performed for Seamless BFD ("S-BFD") with respect to a Source Port parameter.

FIG. 4A illustrates a simplified block diagram of an MPLS domain 60 for implementing an application-aware ECMP discovery mechanism in accordance with embodiments described herein. In particular, FIG. 4A illustrates a path discovery process for an external application Seamless BFD ("S-BFD"). In the example shown in FIG. 4A, S-BFD may be used to discover all available ECMP paths between router R1 and router R6. It can then setup a BFD session to monitor each of the discovered paths individually for any faults. The S-BFD sessions in this case will be IP-BFD sessions, such that the source and destination IP addresses are the fixed as loopbacks of routers R1 and R6. The destination UDP port (7784) is also defined by a standard (i.e., IETF RFC 7881) and cannot be modified. This only leaves source UDP port, which S-BFD application can control, as the ECMP variable available for path discovery. A Label Switched Path Verification ("LSPV") application executing in the network processes MPLS Ping, Traceroute, and Tree Trace requests. The client application ("S-BFD") may request LSPV to perform path discovery on its behalf and supply it the source and destination IP addresses, the destination UDP port, and the source UDP port range for the purpose.

Referring to FIG. 4A, LSPV at router R1 uses an MPLS echo request and reply mechanism to discover and traverse all ECMP in the domain 32 for itself as well as the client application (in this case, S-BFD). An Echo request 60 carries a well-defined Downstream Mapping ("DSMAP") TLV 62 along with an ASM TLV 64. The ASM TLV 64 also includes ASM sub-TLVs and a multipath TLV for the parameter on which to load-balance for the application (127/8 range IP address for DSMAP TLV 62 and Src Port beginning with 49152 for ASM TLV 64). In the embodiment illustrated in FIG. 4A, the parameter on which to load balance for the application is the source port (as indicated by the fact that the H flag of the ASM sub-TLV corresponding to Src Port is set to 1). All bits of a bitmap 66 corresponding to Src Port are initially set to 1. As indicated by an arrow 68, router R1 forwards the echo request 60 to router R2.

Upon receipt of echo request 60, router R2 queries the load-balancing information from the hardware for both TLVs 62, 64. DSMAP TLV 62 specifies how the hardware will load-balance the received echo request packet 60 along the available ECMP. For the ASM TLV 64, LSPV queries hardware for each source port to identify the outgoing path selected by hardware for the application packet. If the source port maps to a particular downstream path, the specific bit representing the source port is set to 1 in the bit map of the TLV corresponding to the path. This operation is repeated for every port in the range. Upon completion, for each port in the range, a bit of a bitmap corresponding to the port is only set for a particular path and the hardware will load balance the source and destination IP addresses and port number combination to that particular path. Note that hardware may load balance the MPLS echo request and client application multipaths differently. The same bit positions may load balance to a different downstream, even if the client application is load balancing on the same IP address range instead of ports.

Figure 4B:
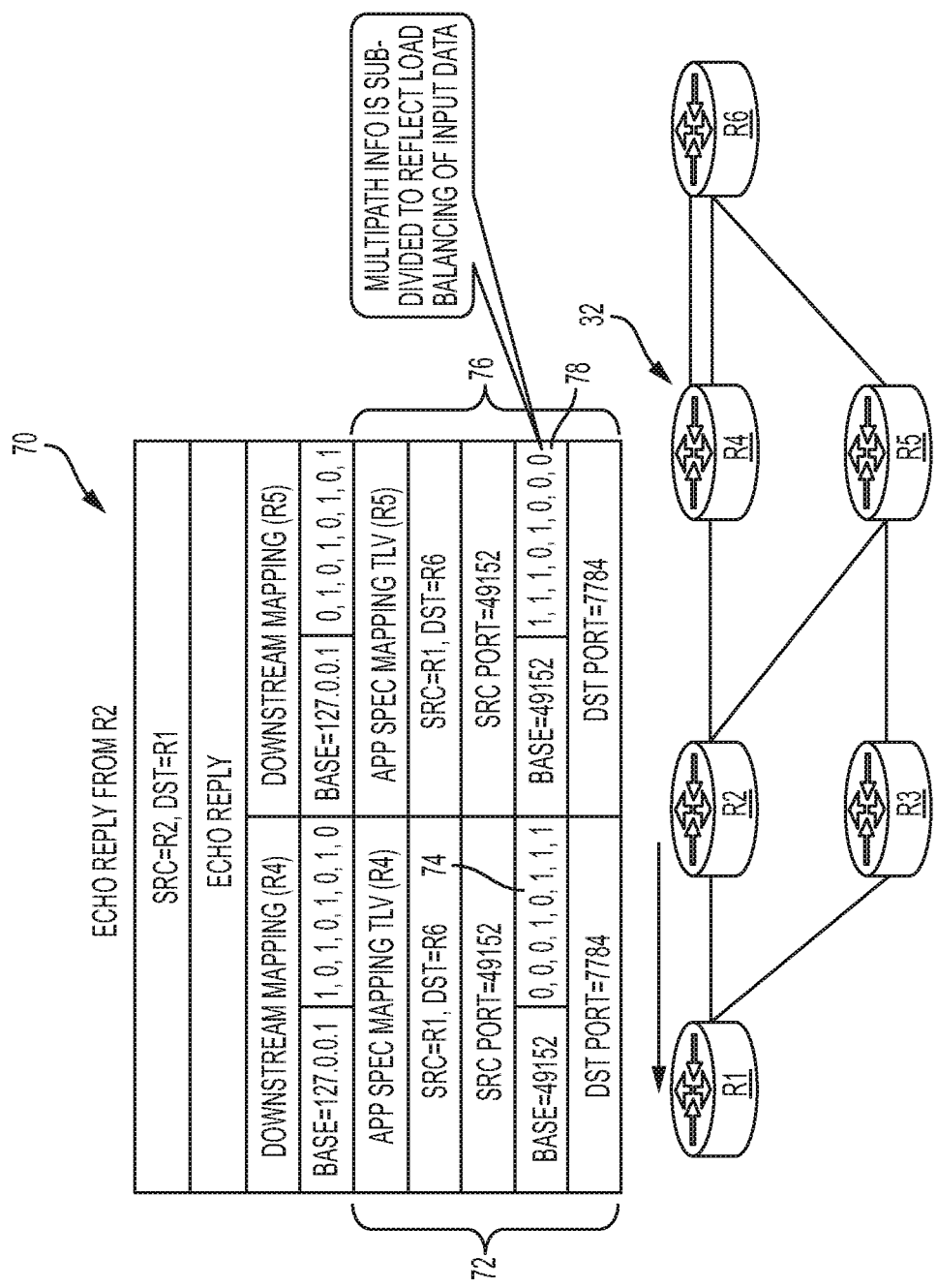

Referring now to FIG. 4B, the router R2 sends an echo response packet 70 constructed by encoding the above information in TLVs for each outgoing path (in this case, router R4 and router R5). The response packet 70 includes a TLV 72 showing that S-BFD packets from router R1 to router R6 will be hashed towards router R4 for source ports 49155, 49157, 49158, and 49159 (as indicated by a bitmap 74) and a TLV 76 showing that S-BFD ports from router R1 to router R6 will be hashed toward router R5 for source ports 49152, 49153, 49154, and 49156 (as indicated in a bitmap 78).

Figure 4C:
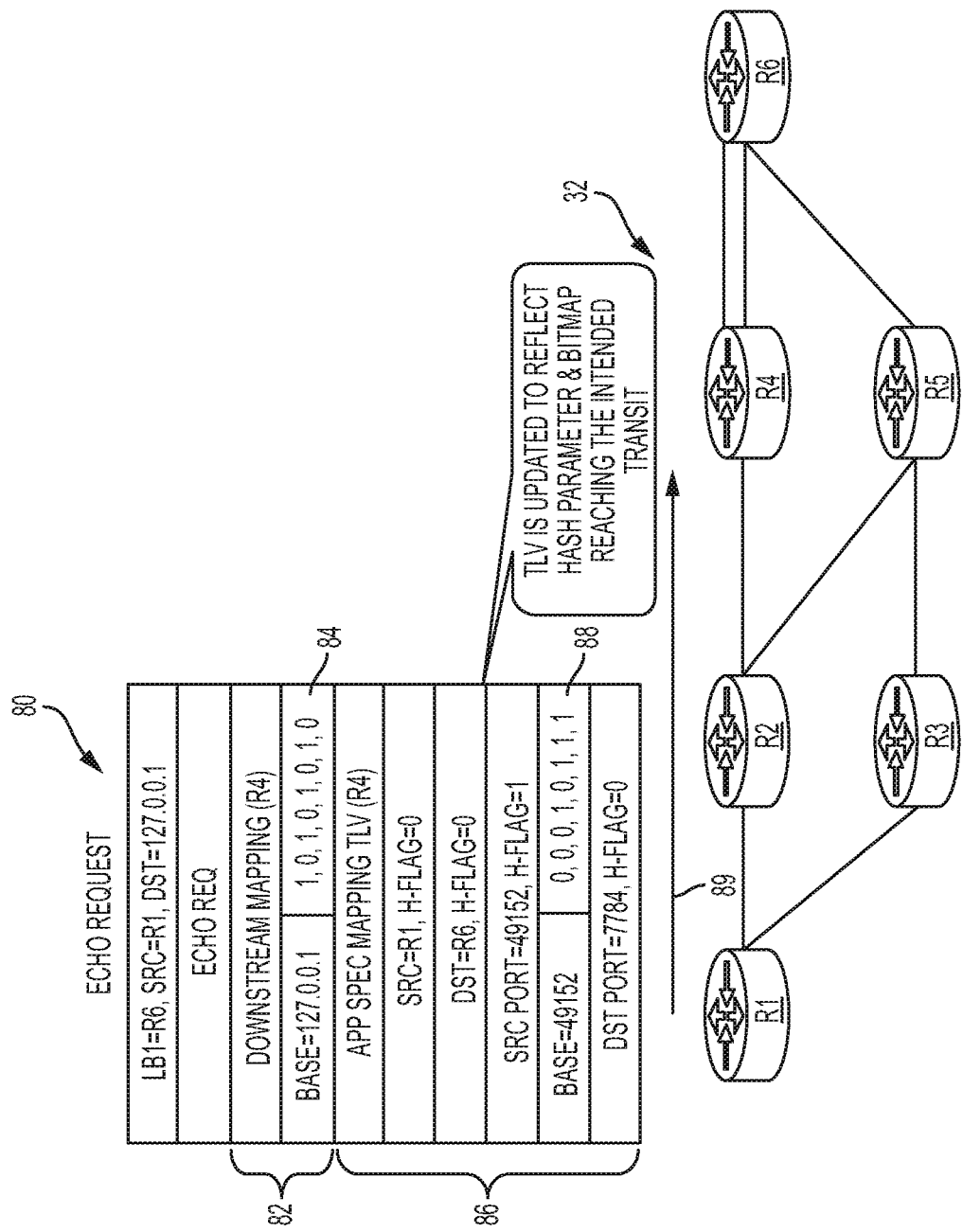

Referring now to FIG. 4C, upon receiving the response packet 70 from router R2, the router R1 constructs a subsequent echo request packet 80 toward router R4 with only the bitmaps applicable between router R2 to router R4 included in it for both MPLS Tree Trace TLV 82 (bitmap 84) and ASM TLV 86 (bitmap 88). Router R1 increments the TTL of the MPLS label to 2, and transmits the echo request 80 toward router R4, as represented by an arrow 89.

Figure 4D:
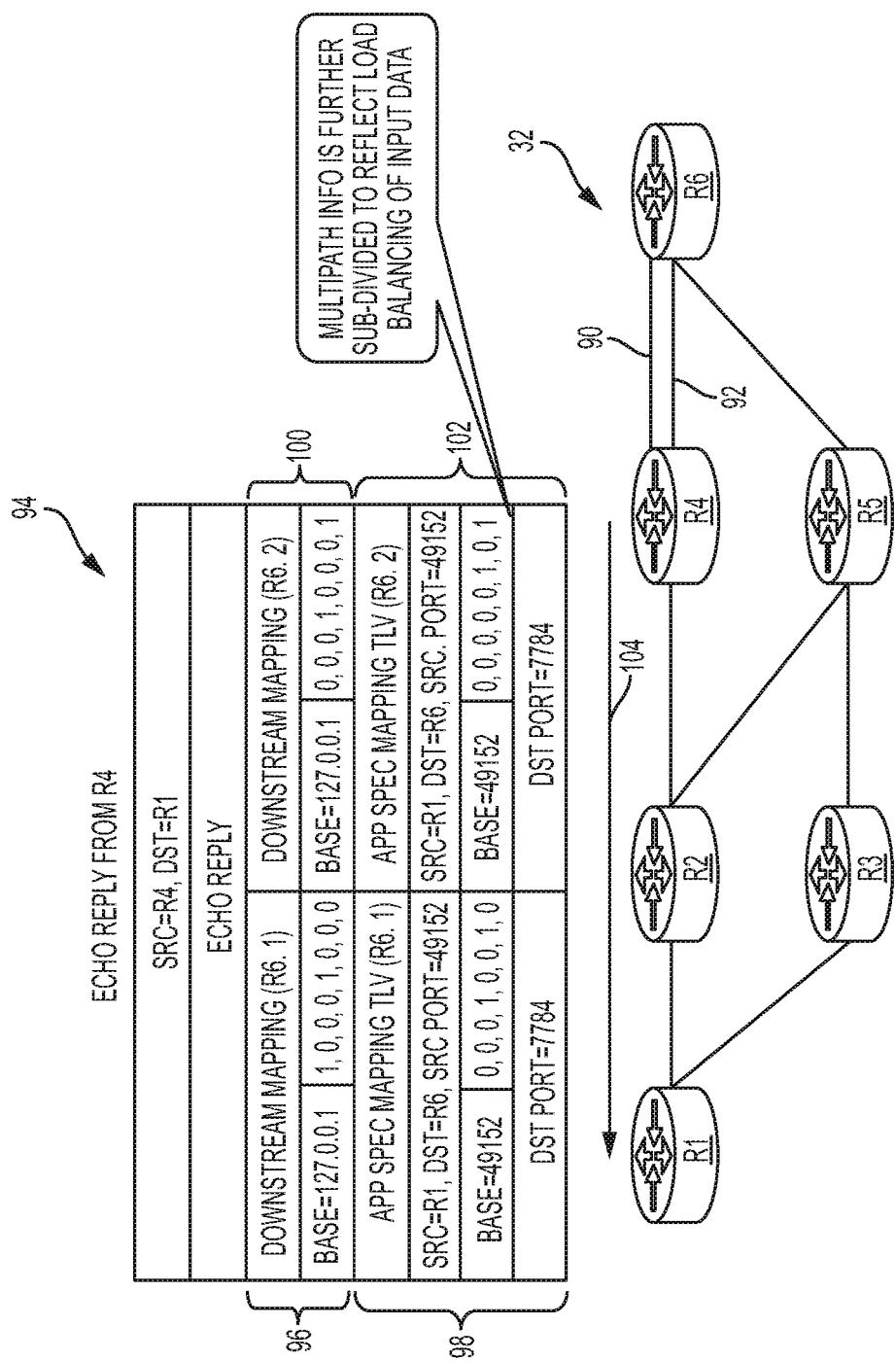

Referring now to FIG. 4D, in a manner similar to router R2, as described above with reference to FIG. 4B, upon receipt of the echo request packet 80, router R4 also load-balances the incoming multipath information for each of the TLVs 82, 86, on two available paths 90, 92, toward router R6. The results are conveyed back to router R1 in an echo reply packet 94, which includes a DSMAP TLV 96 and an ASM TLV 98 for link 90 and an DSMAP TLV 100 and an ASM TLV 102 for link 92, as indicated by an arrow designated by a reference numeral 104. Router R1 will continue exploration along the returned paths in a depth-first fashion until reaching the egress node router R6. Once a particular path reaches the egress node, it is marked as fully explored and router R1 falls back to remaining unexplored paths. The process is repeated for other available paths (router R2-router R5 and router R1-router R3) until all possible paths between router R1 and router R6 have been explored.

Figure 4E:
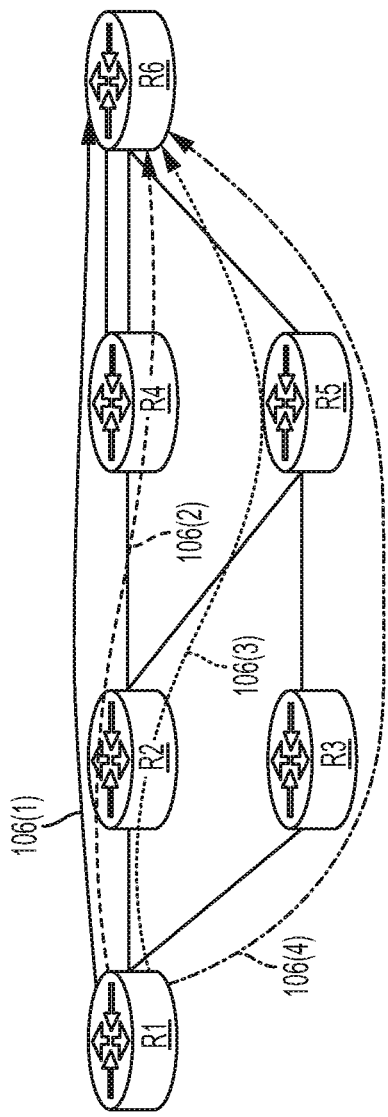
Figure 5A:
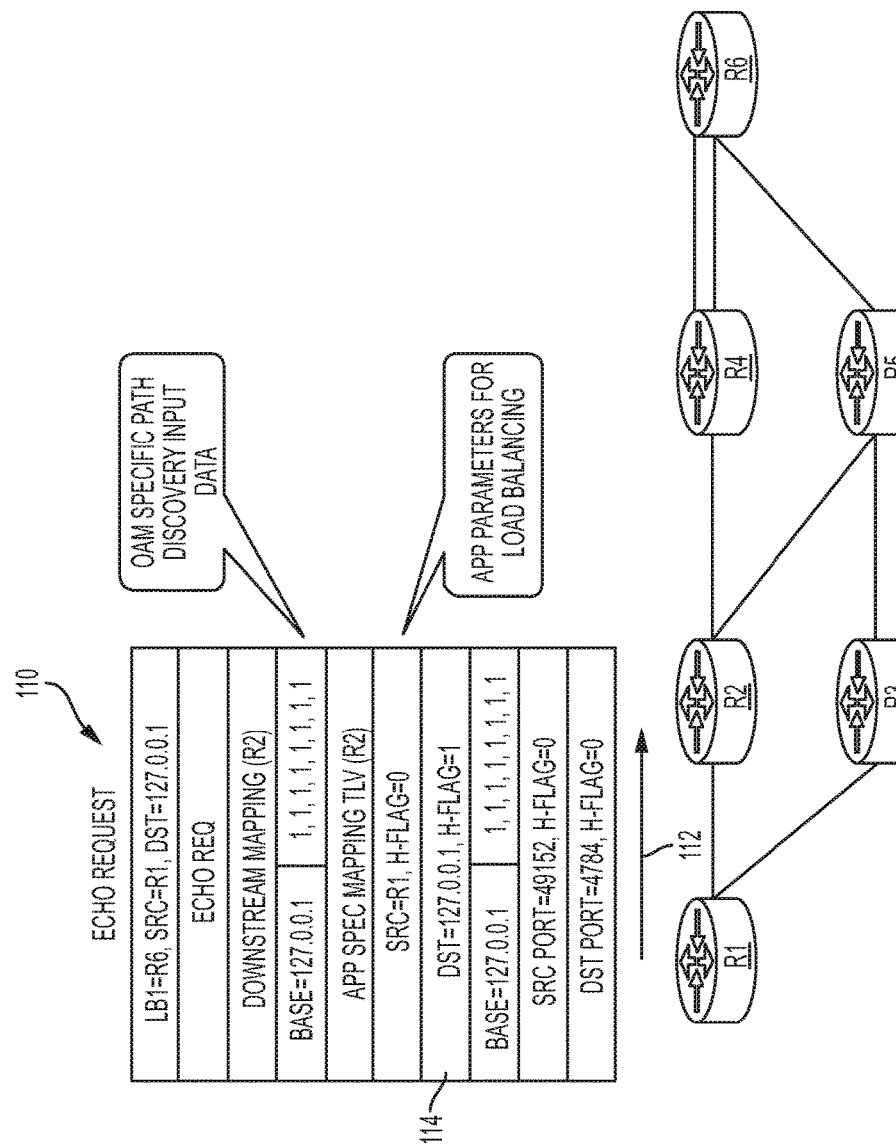
FIGS. 5A-5E illustrate simplified block diagrams of the telecommunications network of FIGS. 4A-4E in which load balancing is performed for Multi-Hop BFD ("MH-BFD") with respect to a Destination address parameter in accordance with embodiments described herein.
Figure 5B:
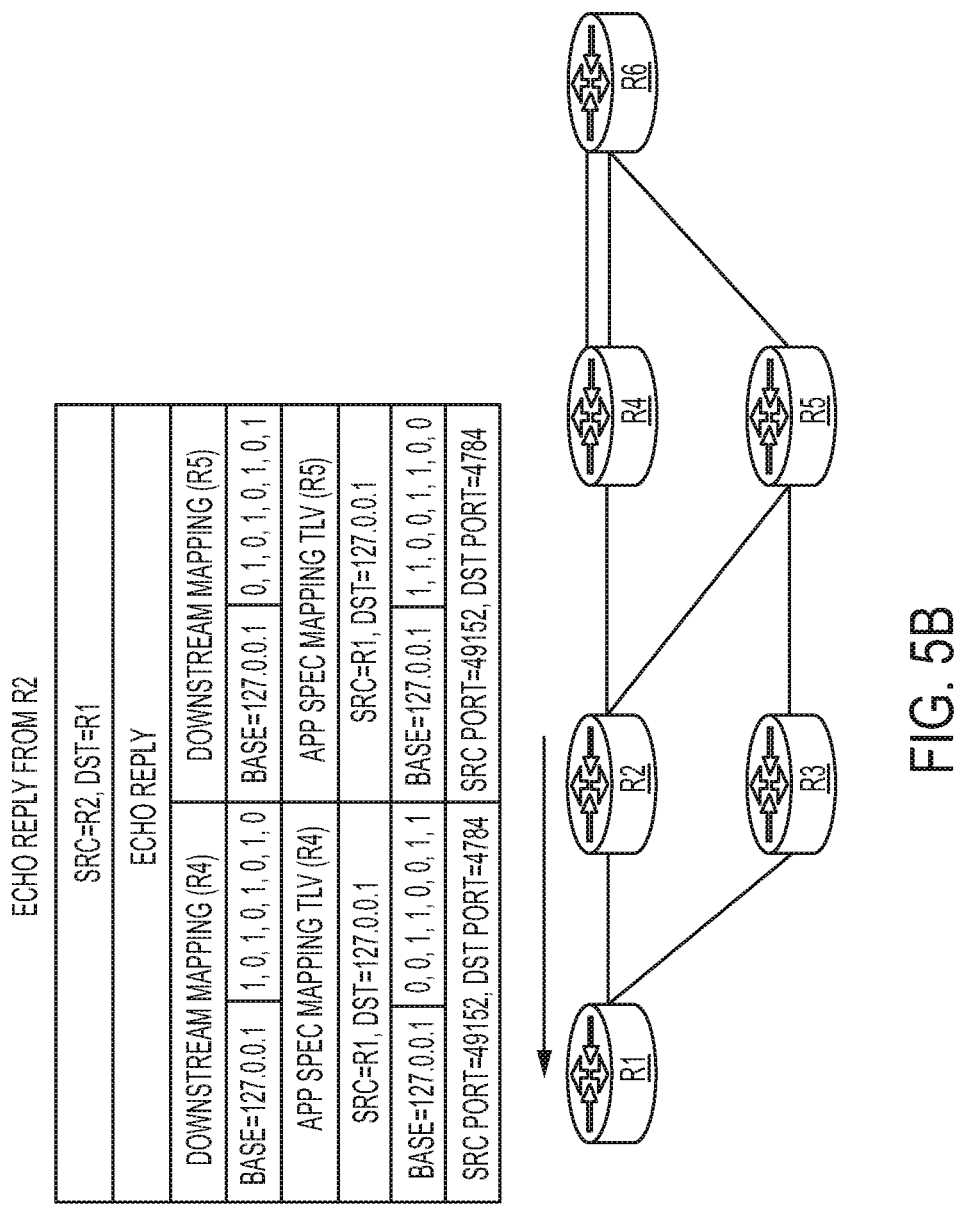
Figure 5C:
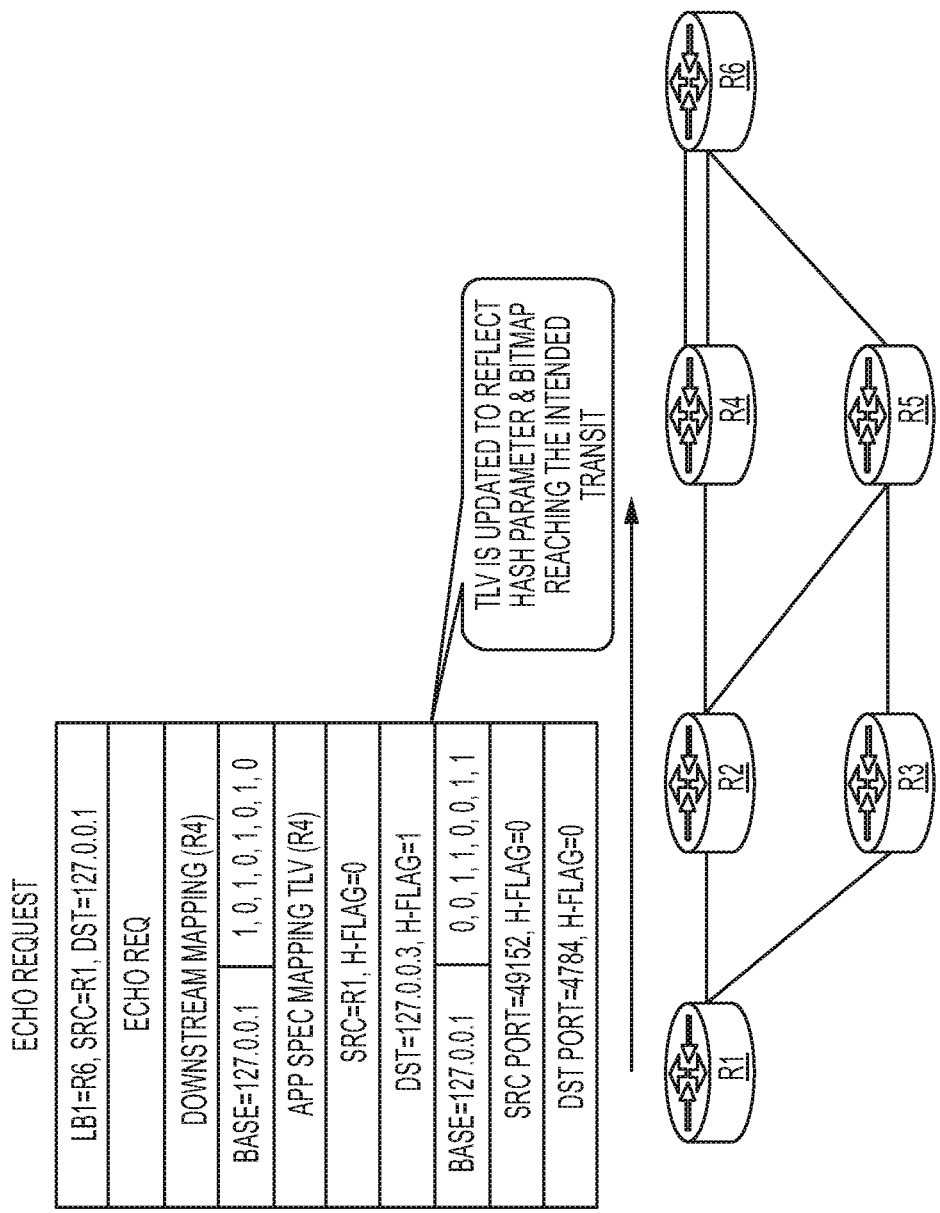
Figure 5D:
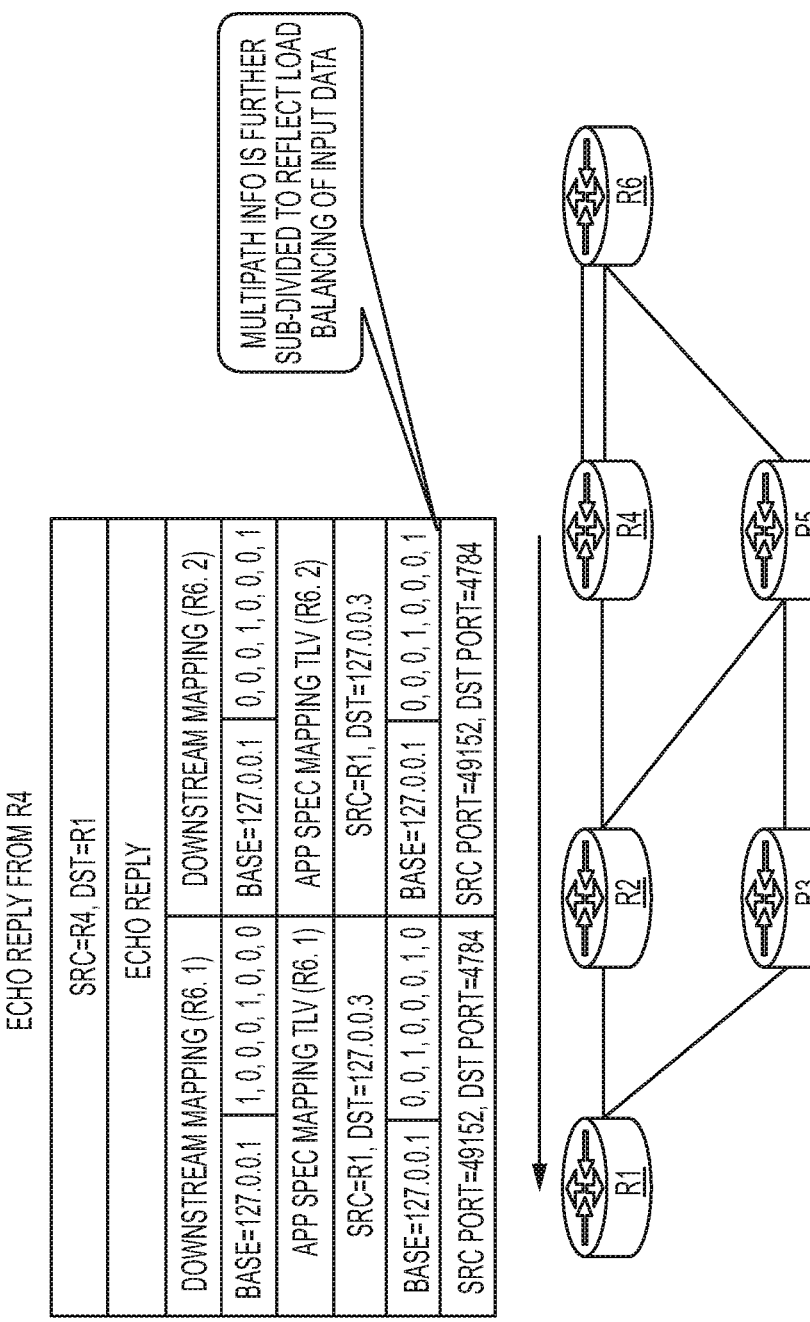
Figure 5E:
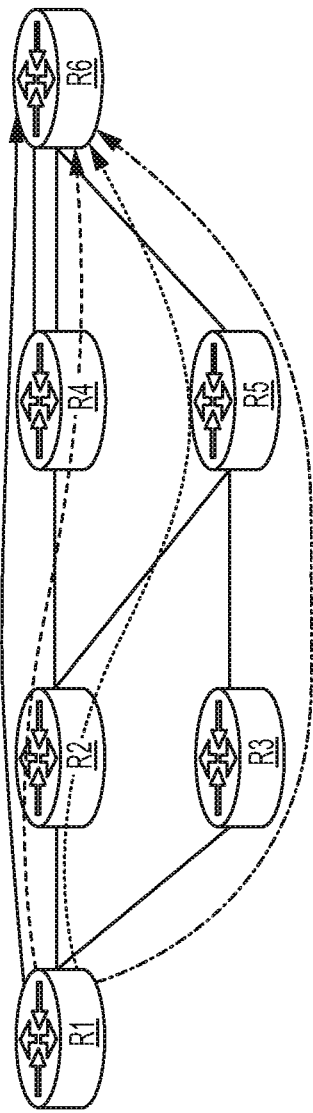
Figure 6A:
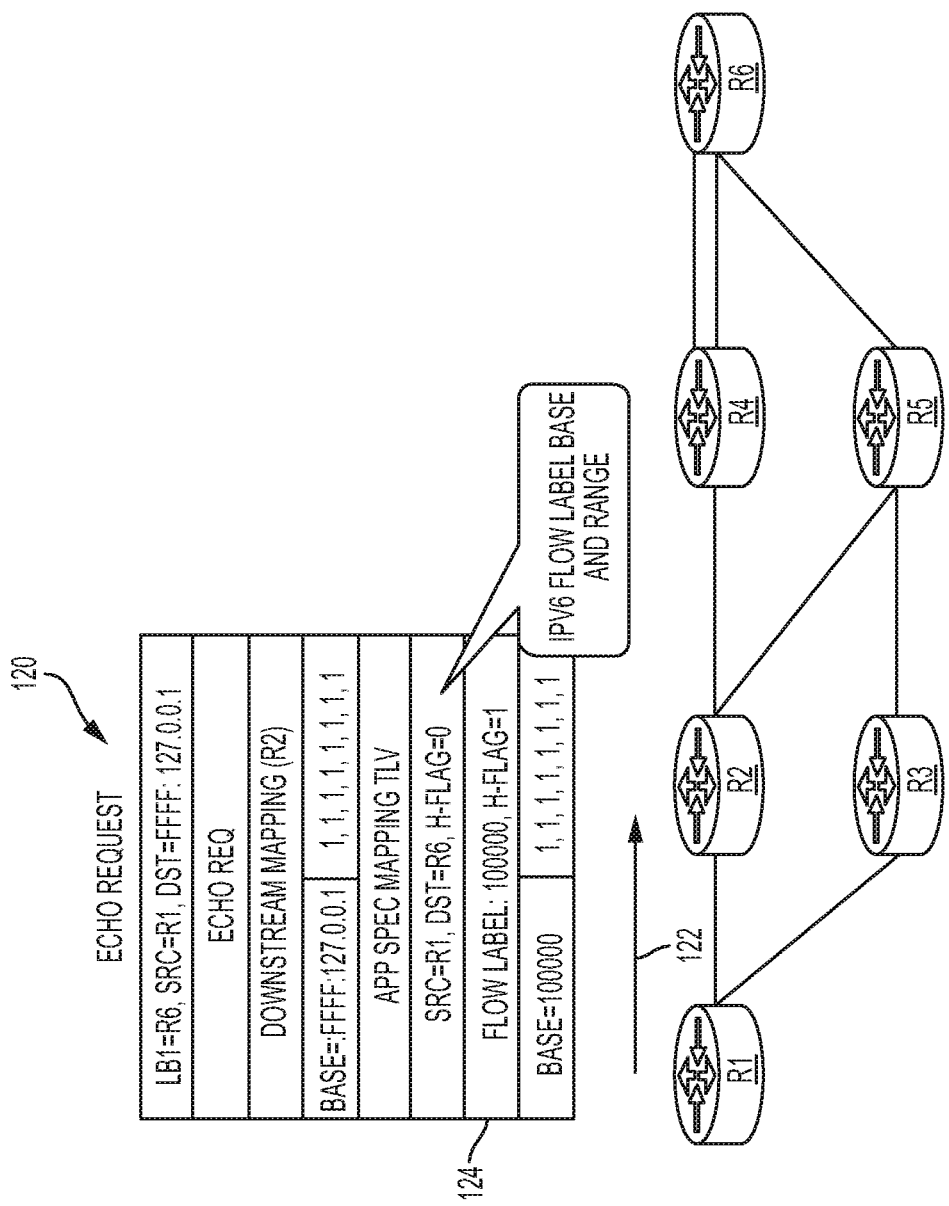
FIGS. 6A-6E illustrate simplified block diagrams of the telecommunications network of FIGS. 4A-4E in which load balancing is performed for IPv6 with respect to a Flow Label parameter in accordance with embodiments described herein.
Figure 6B:
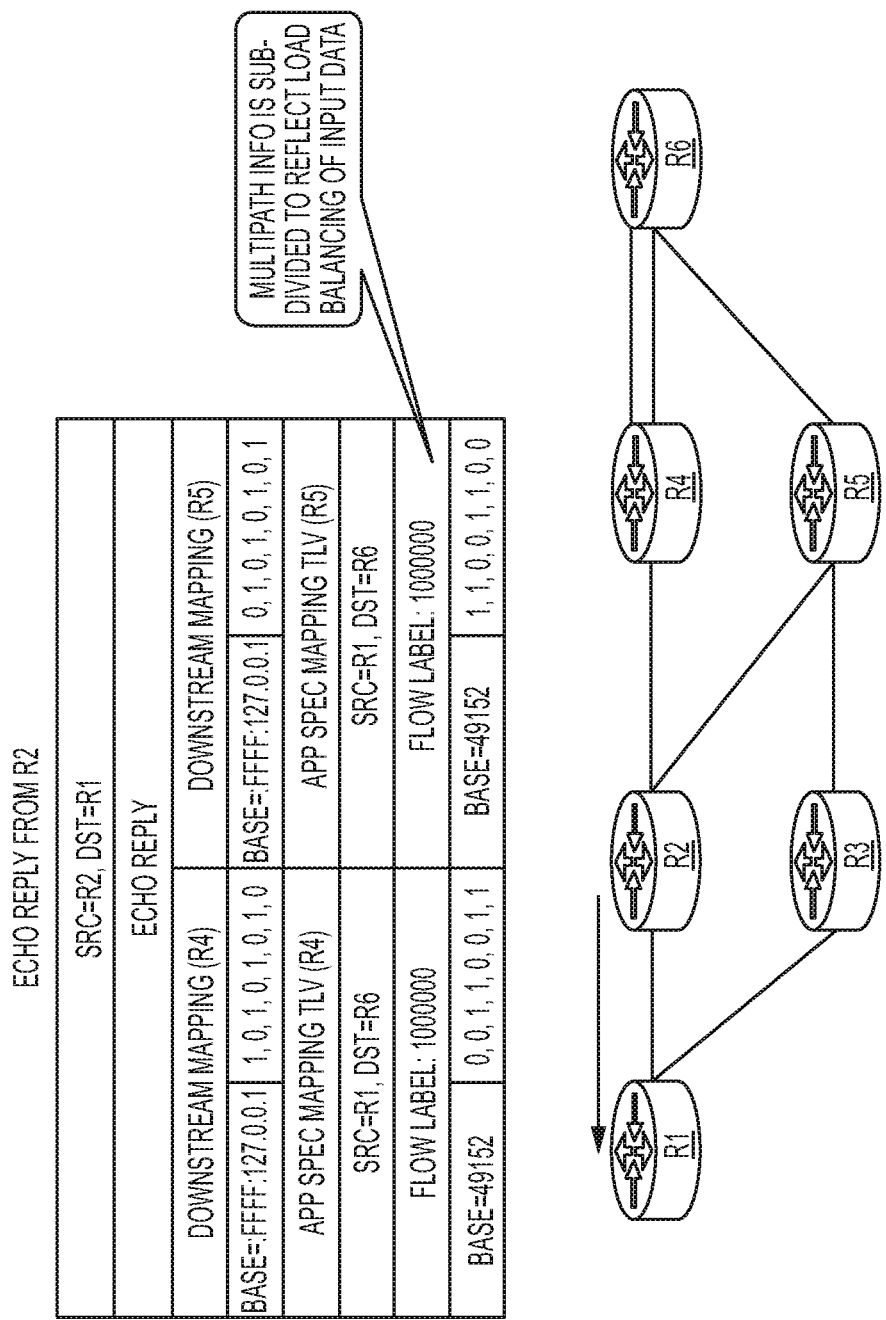
Figure 6C:
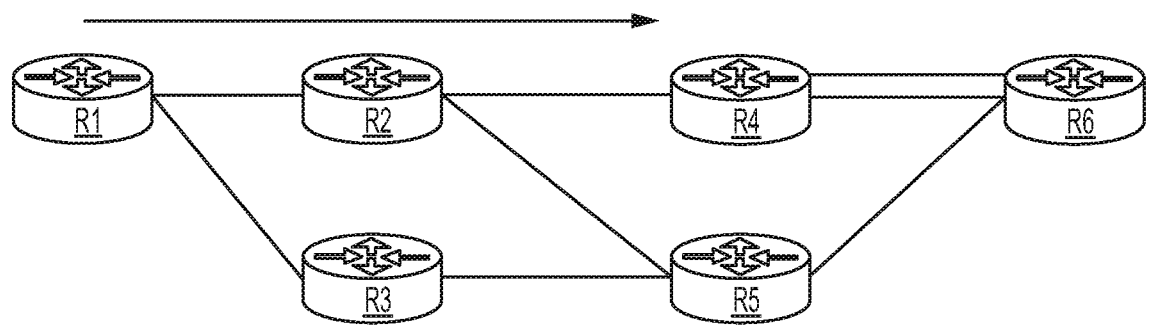
Figure 6D:
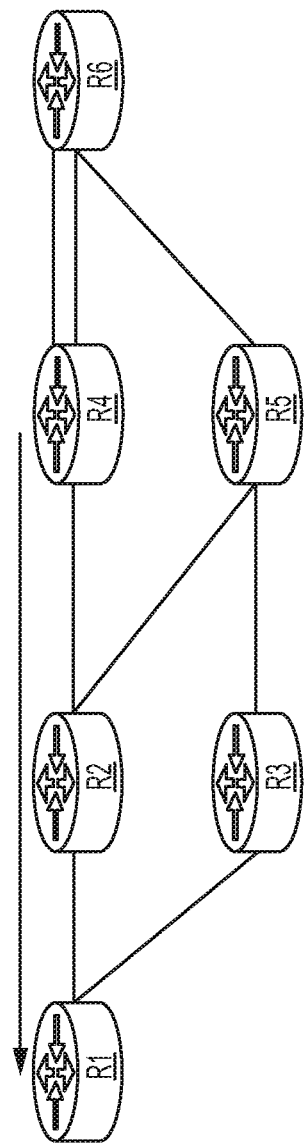
Figure 6E:
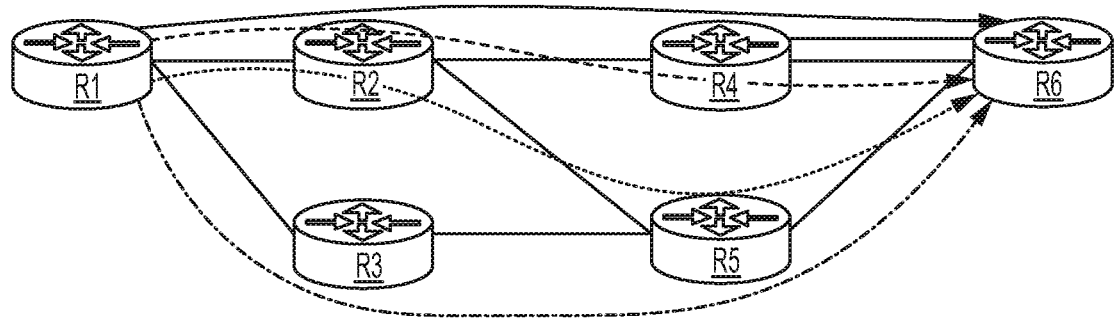

Referring now to FIG. 4E, once all available paths 106(1), 106(2), 106(3), and 106(4) (respectively corresponding to Path 1, Path 2, Path 3, and Path 4), between the source and destination been discovered in the above-described manner, the information in the bitmaps can be combined and returned to the application. The application can use the discovered information to create an S-BFD session along each path 106(1)-106(4) toward the destination. The application can also periodically perform path discovery to refresh its load-balancing information in face of any network changes.

FIGS. 5A-5E illustrate an ECMP discovery process in accordance with embodiments described herein for Multi-Hop BFD ("MH-BFD"), in which load balancing is performed on the destination IP address, as indicated in an echo request 110 (FIG. 5A) sent from router R1 to router R2 along a path 112 (FIG. 5A) by an H flag of an ASM sub-TLV 114 (FIG. 5A) corresponding to Dst being set to 1. Similarly, FIGS. 6A-6E illustrate an ECMP discovery process in accordance with embodiments described herein for IPv6, in which load balancing is performed on the flow label, as indicated in an echo request 120 (FIG. 6A) sent from router R1 to router R2 along a path 122 (FIG. 6A) by an H flag of an ASM sub-TLV 124 (FIG. 6A) corresponding to Flow Label being set to 1.

Figure 7A:
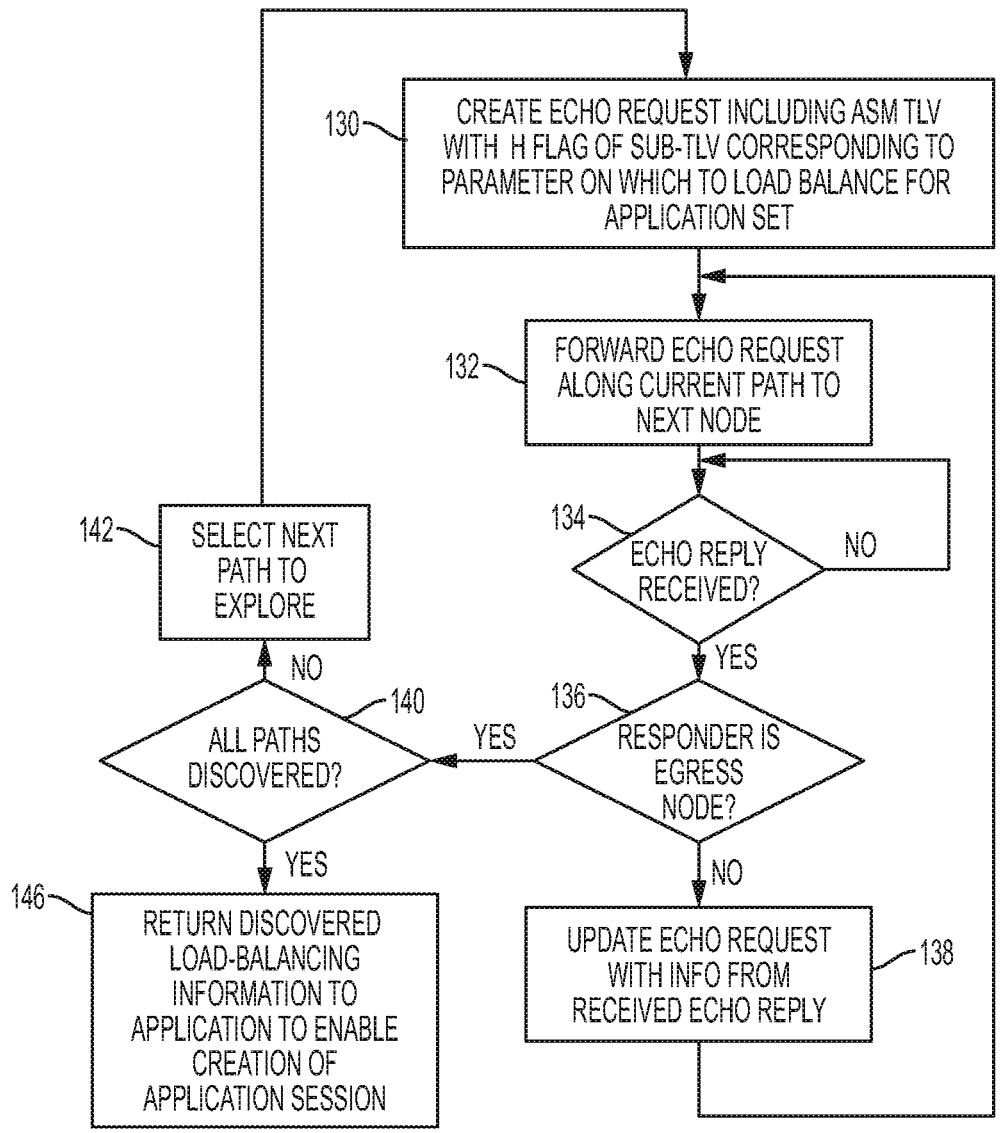
FIG. 7A is a flowchart illustrating example operations that may be performed by an ingress node of an MPLS domain for implementing an application-aware ECMP discovery mechanism in accordance with embodiments described herein.

FIG. 7A is a flowchart illustrating example operations that may be performed by an ingress node of an MPLS domain for implementing an application-aware ECMP discovery mechanism in accordance with embodiments described herein. As shown in FIG. 7A, in step 130, an echo request is created and includes an ASM TLV with the H flag of the sub-TLV corresponding to the parameter on which to load balance for the application set to 1. In step 132, the echo request created in step 130 is forwarded along the current path to the next node on the path. In step 134, the ingress node awaits receipt of an echo reply. Once a reply is received, execution proceeds to step 136, a determination is made whether the responder (i.e., the node that sent the echo reply) is an egress node. If not, execution proceeds to step 138, in which an echo request is created using the information from the received echo reply, and then returns to step 132.

Returning to step 136, if a determination is made that the responder is the egress node, indicating that the end of the path has been reached, execution proceeds to step 140, in which a determination is made whether all paths in the network have been discovered. If not, in step 142, the next path is selected and execution returns to step 130. In particular, information from the previous response is used to traverse the next unexplored next hop. If it is determined in step 140 that all paths in the network have been discovered, execution proceeds to step 146, in which the discovered load balancing information is returned to the application to enable creation of a session for the application using the information.

Figure 7B:
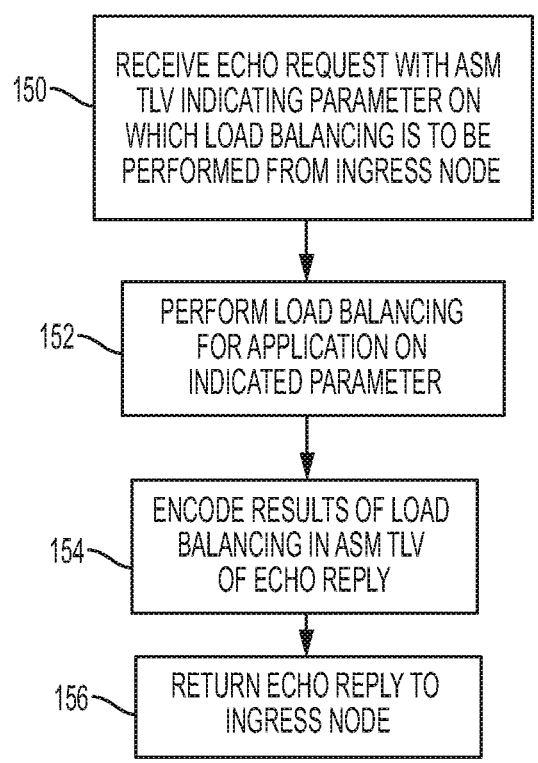
FIG. 7B is a flowchart illustrating example operations that may be performed by a transit node or an egress node of an MPLS domain for implementing an application-aware ECMP discovery mechanism in accordance with embodiments described herein.

FIG. 7B is a flowchart illustrating example operations that may be performed by a transit node or an egress node of an MPLS domain for implementing an application-aware ECMP discovery mechanism in accordance with embodiments described herein. Referring to FIG. 7B, in step 150, an echo request with an ASM TLV indicating a parameter on which load balancing is to be performed is received from the ingress node. In step 152, load balancing is performed for the application on the indicated parameter. In step 154, load balancing results for each downstream path are encoded in the respective ASM TLV of the echo reply. In step 156, the echo reply is returned to the ingress node.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 8:
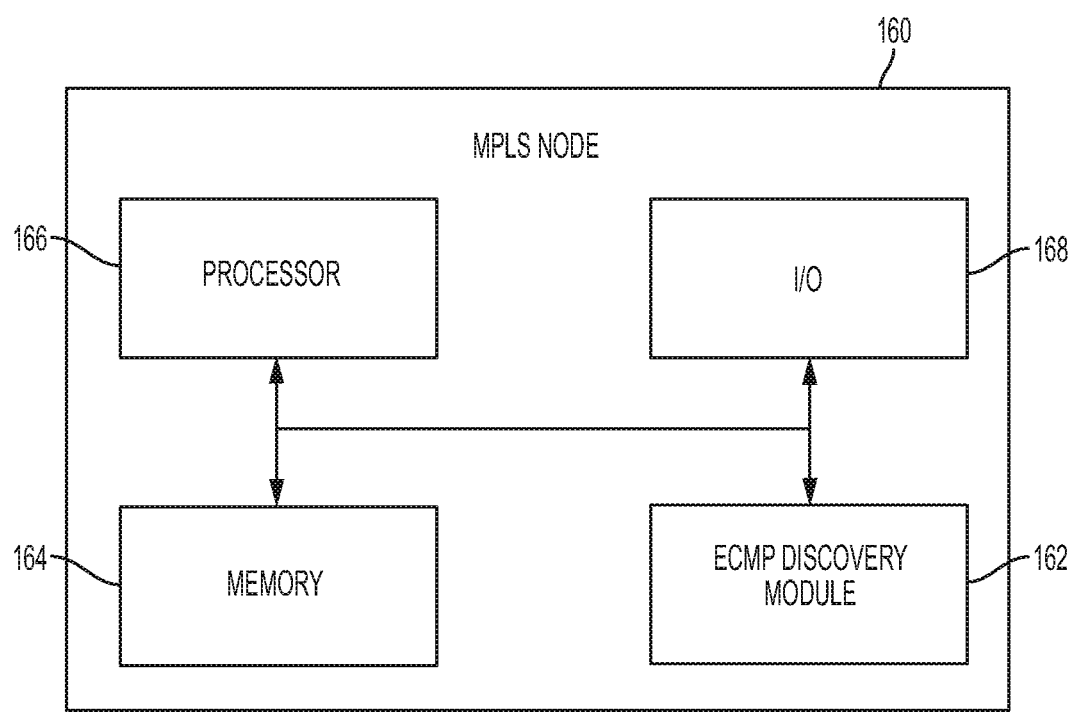
FIG. 8 is a simplified block diagram of an MPLS node configured for implementing an application-aware ECMP discovery mechanism in accordance with embodiments described herein.

For example, referring to FIG. 8, an MPLS node 160, which may be implemented as an LSR, may include an ECMP discovery module 162 comprising software embodied in one or more tangible media for facilitating the activities described herein. In particular, the ECMP discovery module 162 may comprise software for facilitating the processes illustrated in and described with reference to FIGS. 7A and 7B. The node 160 may also include a memory device 164 for storing information to be used in achieving the functions as outlined herein. Additionally, the node 160 may include a processor 166 that is capable of executing software or an algorithm (such as embodied in module 162) to perform the functions as discussed in this Specification. The node 160 may also include various I/O 168 necessary for performing functions described herein.

Figure 9:
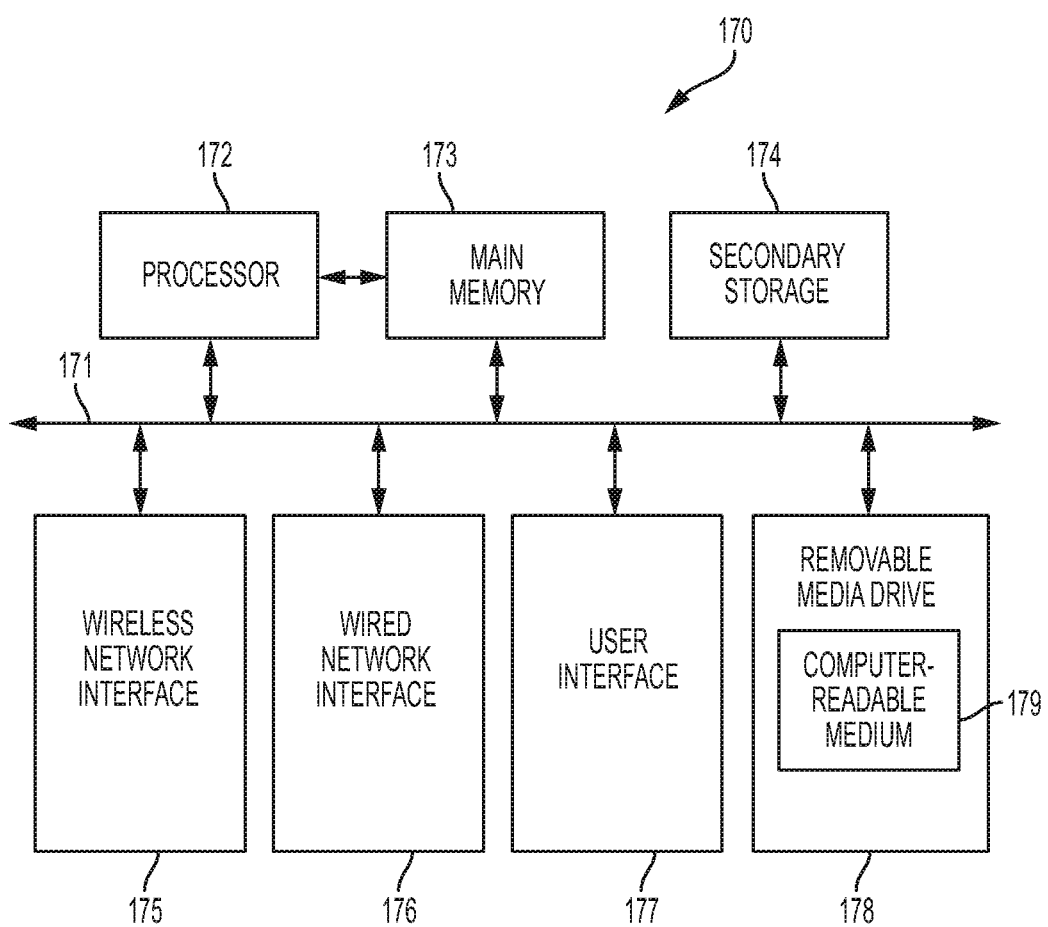
FIG. 9 is a simplified block diagram of a machine comprising an element of a communications network in which techniques for implementing an application-aware ECMP discovery mechanism in accordance with embodiments described herein.

Turning now to FIG. 8, illustrated therein is a simplified block diagram of an example machine (or apparatus) 170, which in certain embodiments may be an MPLS node, that may be implemented in embodiments described herein. The example machine 170 corresponds to network elements and computing devices that may be deployed in a communications network, such as an MPLS node. In particular, FIG. 9 illustrates a block diagram representation of an example form of a machine within which software and hardware cause machine 170 to perform any one or more of the activities or operations discussed herein. As shown in FIG. 9, machine 170 may include a processor 172, a main memory 173, secondary storage 174, a wireless network interface 175, a wired network interface 176, a user interface 177, and a removable media drive 178 including a computer-readable medium 179. A bus 171, such as a system bus and a memory bus, may provide electronic communication between processor 172 and the memory, drives, interfaces, and other components of machine 170.

Processor 172, which may also be referred to as a central processing unit ("CPU"), can include any general or special-purpose processor capable of executing machine readable instructions and performing operations on data as instructed by the machine-readable instructions. Main memory 173 may be directly accessible to processor 172 for accessing machine instructions and may be in the form of random access memory ("RAM") or any type of dynamic storage (e.g., dynamic random access memory ("DRAM")). Secondary storage 174 can be any non-volatile memory such as a hard disk, which is capable of storing electronic data including executable software files. Externally stored electronic data may be provided to computer 170 through one or more removable media drives 178, which may be configured to receive any type of external media such as compact discs ("CDs"), digital video discs ("DVDs"), flash drives, external hard drives, etc.

Wireless and wired network interfaces 175 and 176 can be provided to enable electronic communication between machine 170 and other machines, or nodes. In one example, wireless network interface 175 could include a wireless network controller ("WNIC") with suitable transmitting and receiving components, such as transceivers, for wirelessly communicating within a network. Wired network interface 176 can enable machine 170 to physically connect to a network by a wire line such as an Ethernet cable. Both wireless and wired network interfaces 175 and 176 may be configured to facilitate communications using suitable communication protocols such as, for example, Internet Protocol Suite ("TCP/IP"). Machine 170 is shown with both wireless and wired network interfaces 175 and 176 for illustrative purposes only. While one or more wireless and hardwire interfaces may be provided in machine 170, or externally connected to machine 170, only one connection option is needed to enable connection of machine 170 to a network.

A user interface 177 may be provided in some machines to allow a user to interact with the machine 170. User interface 177 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 178 represents a drive configured to receive any type of external computer-readable media (e.g., computer-readable medium 179). Instructions embodying the activities or functions described herein may be stored on one or more external computer-readable media. Additionally, such instructions may also, or alternatively, reside at least partially within a memory element (e.g., in main memory 173 or cache memory of processor 172) of machine 170 during execution, or within a non-volatile memory element (e.g., secondary storage 174) of machine 170. Accordingly, other memory elements of machine 170 also constitute computer-readable media. Thus, "computer-readable medium" is meant to include any medium that is capable of storing instructions for execution by machine 170 that cause the machine to perform any one or more of the activities disclosed herein.

Not shown in FIG. 9 is additional hardware that may be suitably coupled to processor 172 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 170 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 170 to appropriately manage the operation of the hardware components therein.

The elements, shown and/or described with reference to machine 170, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 173, secondary storage 174, computer-readable medium 179) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 172) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
creating at an ingress node of a communications network a request message including an identifier that identifies a hashing parameter for a network application, wherein the identifier corresponds to a range of values for the hashing parameter to enable load balancing for packets associated with the network application;
forwarding the request message to a node associated with a next hop along a first path through the network between the ingress node and an egress node; and
receiving a response message from the node associated with the next hop, wherein the response message includes load balancing information for the node associated with the next hop corresponding to the range of values for the hashing parameter.

2. The method of claim 1, further comprising determining whether the node associated with the next hop comprises the egress node and if so, determining whether all of a plurality of paths through the network between the ingress node and the egress node have been explored.

3. The method of claim 2, further comprising, if all of the paths through the network between the ingress node and the egress node have been explored, returning the load balancing information for all of the paths to the application.

4. The method of claim 2, further comprising, if all of the paths through the network have not been discovered, selecting a next one of the paths through the network to explore.

5. The method of claim 1 further comprising, if the node associated with the next hop does not comprise the egress node:
creating a new request message using the load balancing information included in the response message; and
forwarding the new request message to a node associated with a next next hop along the first path through the network.

6. The method of claim 1, wherein the hashing parameter comprises at least one of a source IP address, a destination IP address, source port identifier, destination port identifier, and flow label.

7. The method of claim 1, wherein the load balancing information comprises a bitmap, wherein each bit of the bitmap corresponds to one value of the range of values of the identified hashing parameter.

8. The method of claim 1, wherein the request message is a multiprotocol label switching ("MPLS") echo request packet used as part of an application-aware Equal Cost Multipath (ECMP) discovery process, and the response message comprises an MPLS echo response packet.

9. The method of claim 1, wherein the request message is generated by a client application to a Label Switched Path Verification (LSPV) application executing in the network to request the LSPV application to perform path discovery and in response provide source and destination IP addresses, a destination User Datagram Protocol (UDP) port, and a source UDP port range.

10. One or more non-transitory tangible media that includes code for execution and when executed by a processor is operable to perform operations comprising:
creating at an ingress node of a communications network a request message including an identifier that identifies a hashing parameter for a network application, wherein the identifier corresponds to a range of values for the hashing parameter to enable load balancing for packets associated with the network application;
forwarding the request message to a node associated with a next hop along a first path through the network between the ingress node and an egress node; and
receiving a response message from the node associated with the next hop, wherein the response message includes load balancing information for the node associated with the next hop corresponding to the range of values for the hashing parameter.

11. The media of claim 10, wherein the operations further comprise determining whether the node associated with the next hop comprises the egress node and if so, determining whether all of a plurality of paths through the network between the ingress node and the egress node have been explored.

12. The media of claim 11, wherein the operations further comprise, if all of the paths through the network between the ingress node and the egress node have been explored, returning the load balancing information for all of the paths to the application.

13. The media of claim 11, wherein the operations further comprise, if all of the paths through the network have not been discovered, selecting a next one of the paths through the network to explore.

14. The media of claim 10, wherein the operations further comprise:
if the node associated with the next hop does not comprise the egress node:
creating a new request message using the load balancing information included in the response message; and
forwarding the new request message to a node associated with a next next hop along the first path through the network.

15. The media of claim 10, wherein the request message is a multiprotocol label switching ("MPLS") echo request packet used as part of an application-aware Equal Cost Multipath (ECMP) discovery process, and the response message comprises an MPLS echo response packet.

16. The media of claim 10, wherein the request message is generated by a client application to a Label Switched Path Verification (LSPV) application executing in the network to request the LSPV application to perform path discovery and in response provide source and destination IP addresses, a destination User Datagram Protocol (UDP) port, and a source UDP port range.

17. An apparatus comprising:
a communication interface configured to enable network communications;
a memory element configured to store data; and
a processor operable to execute instructions associated with the data, to perform operations including;
creating at an ingress node of a communications network a request message including an identifier that identifies a hashing parameter for a network application, wherein the identifier corresponds to a range of values for the hashing parameter to enable load balancing for packets associated with the network application;
forwarding the request message to a node associated with a next hop along a first path through the network between the ingress node and an egress node; and
receiving a response message from the node associated with the next hop, wherein the response message includes load balancing information for the node associated with the next hop corresponding to the range of values for the hashing parameter.

18. The apparatus of claim 17, further configured for determining whether the node associated with the next hop comprises the egress node and if so, determining whether all of a plurality of paths through the network between the ingress node and the egress node have been explored.

19. The apparatus of claim 17, wherein the request message is a multiprotocol label switching ("MPLS") echo request packet used as part of an application-aware Equal Cost Multipath (ECMP) discovery process, and the response message comprises an MPLS echo response packet.

20. The apparatus of claim 17, wherein the request message is generated by a client application to a Label Switched Path Verification (LSPV) application executing in the network to request the LSPV application to perform path discovery and in response provide source and destination IP addresses, a destination User Datagram Protocol (UDP) port, and a source UDP port range.

* * * * *